Aug. 7, 1945.   J. L. McKEOWN   2,381,357
CABLE THIMBLE AND CLAMP
Filed April 12, 1944
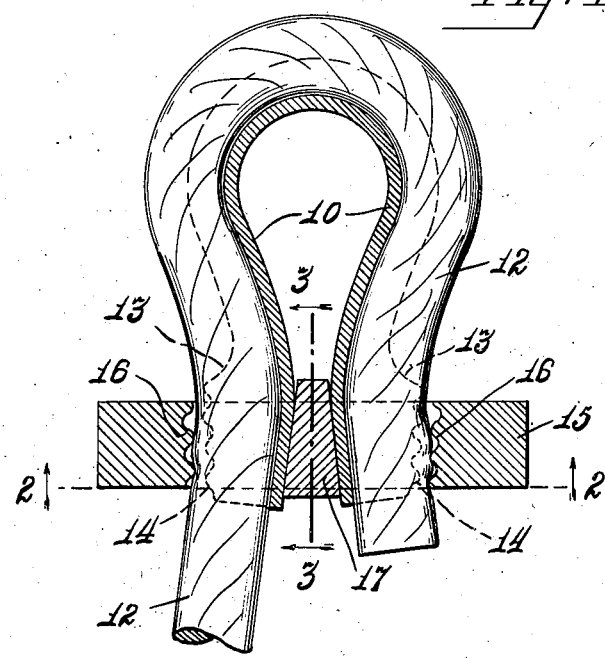
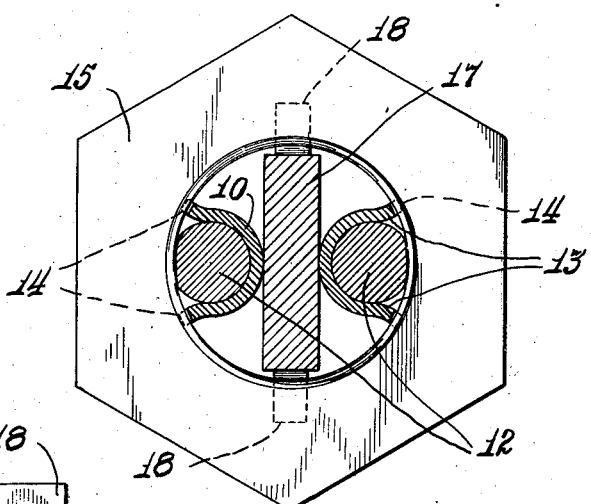
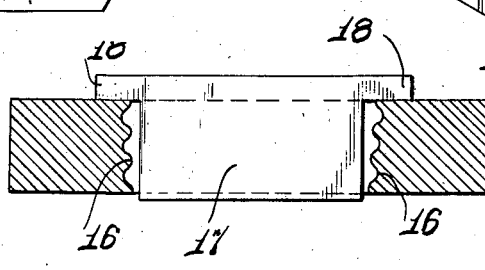
INVENTOR
JOHN L. McKEOWN
By Brayton Richards
ATTORNEY Patented Aug. 7, 1945

2,381,357

UNITED STATES PATENT OFFICE 2,381,357

CABLE THIMBLE AND CLAMP

John L. McKeown, Winnetka, Ill.

Application April 12, 1944, Serial No. 530,711

5 Claims. (Cl. 287—81)

The invention relates to improvements in cable thimbles and clamps and has for its primary object the provision of a combined arrangement of the character indicated which is of simple construction and highly efficient in use.

Other objects will appear hereinafter.

The invention consists of the combinations and arrangements of parts hereinafter described and claimed.

The invention will be best understood by reference to the accompanying drawing forming a part of this specification and in which—

Fig. 1 is a longitudinal section taken through a combined cable thimble and clamp embodying the invention;

Fig. 2, a section taken substantially on line 2—2 of Fig. 1; and

Fig. 3, a section taken substantially on line 3—3 of Fig. 1.

The embodiment of the invention illustrated in the drawing comprises a cable thimble 10 in the form of a loop open at its inner end and having the usual lips to accommodate the usual bight or loop of the cable 12 as indicated. Adjacent the ends of the thimble the lips are extended outwardly at 13 and provided with rounded tapered threads 14 adapted to engage a nut 15 having correspondingly rounded tapered threads 16 and whereby the cable 12 may be compressed against the ends of the thimble 11, as will be readily understood. A wedge 17 is inserted between the ends of the thimble 10 and provided with laterally extending arms 18 which engage against the inner side of the nut 15 so that when said nut is tightened, said wedge will be forced inwardly between the thimble ends, thereby spreading said thimble ends to clamp and compress the corresponding cable portions and thus safely secure the cable to the thimble, as will be readily understood.

The specific form and arrangement of parts disclosed is a simple and effective one for the purpose.

While I have illustrated and described the preferred form of construction for carrying the invention into effect, this is capable of modification and variation without departing from the spirit of the invention. I therefore do not wish to be limited to the precise details disclosed, but desire to avail myself of such variations and modifications as fall within the scope of the appended claims.

I claim:

1. The combination with a cable and thimble therefor said thimble being in the form of a loop open at its inner end and said cable being looped around the outside thereof, of means for simultaneously spreading the ends of the thimble and compressing the cable against said spread ends.

2. The construction specified in claim 1 in which a wedge is inserted between the ends of the thimble, and a nut is threaded on said thimble and operatively connected with said wedge to spread the thimble ends.

3. The construction specified in claim 1 in which a wedge is inserted between the ends of the thimble, and a taper-threaded nut is threaded on said thimble and operatively connected with said wedge to spread the thimble ends.

4. The construction specified in claim 1 in which a wedge is inserted between the ends of the thimble, and a tapered and round-threaded nut is threaded on said thimble and operatively connected to said wedge to spread the thimble ends.

5. The construction specified in claim 1 in which the lips of the thimble are extended outwardly and provided with tapered threads, a tapered and round-threaded nut engages said threads to compress the cable against the thimble ends, and a wedge is inserted between the thimble ends and is provided with laterally extending arms resting against the inner side of said nut to spread said thimble ends when said nut is tightened.

JOHN L. McKEOWN.